US006064058A

United States Patent [19]

Wu

[11] Patent Number: 6,064,058

[45] Date of Patent: May 16, 2000

[54] PRINTED PAPER IDENTIFICATION SYSTEM

[75] Inventor: Hung-Yi Wu, No. 127, Lane 46, Wen-Hua Rd., Chi-Lung City, Taiwan

[73] Assignee: Hung-Yi Wu, Chi-Lung, Taiwan

[21] Appl. No.: 09/079,865

[22] Filed: May 15, 1998

[51] Int. Cl.[7] .................................................. G06K 5/00

[52] U.S. Cl. ............... 250/226; 250/559.03; 250/559.39; 250/559.4

[58] Field of Search ................................ 250/221, 222.1, 250/223 R, 224, 226, 559.01, 559.03, 559.12, 559.15, 559.39, 559.4, 559.44; 356/71, 402, 408, 425, 432, 433, 434, 435; 382/135; 209/534

[56] References Cited

U.S. PATENT DOCUMENTS

| | | | |
|---|---|---|---|
| 4,592,090 | 5/1986 | Curl et al. | 382/135 |
| 4,618,257 | 10/1986 | Bayne et al. | 356/71 |
| 4,935,628 | 6/1990 | Martin et al. | 250/338.1 |
| 5,367,577 | 11/1994 | Gotaas | 382/135 |
| 5,889,883 | 3/1999 | Simpkins | 382/135 |
| 5,923,413 | 7/1999 | Laskowski | 356/71 |

*Primary Examiner*—John R. Lee
*Attorney, Agent, or Firm*—Winston Hsu

[57] ABSTRACT

The present invention relates to a printed paper identification system for identifying whether a printed paper is a falsified document. The system comprises a paper passage slot and a propeller for driving the printed paper through the passage slot, an identification mechanism having a plurality of light sources and a detecting device installed at two opposite sides of the passage slot, and a controller for actuating the propeller to carry the printed paper through the passage slot, having the detecting device to detect the lights emitted from the light sources and through a predetermined area of the printed paper and generate a correspondent detected signal for each of the light sources, forming one characteristic signal by using the detected signals according to a predetermined procedure, and comparing the characteristic signal with at least one pre-stored identification signal to determine whether the printed paper is a falsified document.

10 Claims, 5 Drawing Sheets

PRINTED PAPER IDENTIFICATION SYSTEM

BACKGROUND OF THE INVENTION

1. Field of the Invention

The invention relates to a printed paper identification system, and more particularly, to a printed paper identification system for identifying whether a printed paper is a falsified document.

2. Description of the Prior Art

Vending machines are widely used for selling various consumer products in the present market. Since some vending machines accept paper money, it is important for a vending machine to determine whether a paper money is a falsified one. Please refer to FIGS. 1 to 3. FIG. 1 is a schematic diagram of a prior art printed paper identification system 10. FIG. 2 is a top view of a printed paper 16. Areas with different brightness are shown in different textures to indicate their different gray levels. FIG. 3 is a detected signal 24 generated by the printed paper 16 shown in FIG. 2.

The printed paper identification system 10 comprises a paper passage slot 11, a propeller 18 for driving the printed paper 16 through the passage slot 11, an LED (light emitting diode) light source 12 and a correspondent light sensor 14 installed separately at two opposite sides of the passage slot 11, and a controller (not shown) electrically connected to the propeller 18 and the light sensor 14 for controlling the propeller 18 to drive the printed paper 16 through the passage slot 11 so that the light sensor 14 can detect the light emitted from the light source 12 and transmitted through a strip area 22 of the printed paper 16, generate a correspondent detected signal 24 as shown in FIG. 3, and compare the detected signal 24 with a pre-stored identification signal to determine whether the printed paper 16 is a falsified document. The identification signal is usually generated by feeding a real printed paper into the system 10 and storing the detected signal generated by the real printed paper in the memory of the controller as the identification signal.

The printed paper 16 can usually be correctly identified by comparing its detected signal 24 with the identification signal stored in the system 10. However, printed papers such as paper money are frequently held by hand or clamped in wallets, the quality of the printed paper 16 may greatly affect its detected signal 24. For example, the color or pictures printed on the surfaces of the printed paper 16 may fade away after long use. Such fading can usually cause a great variation over the waveform of the detected signal 24, and make it very difficult to be identified. The system 10 usually allows certain degree of tolerance over the detected signal 24 generated by the printed paper 16 so as to allow a real printed paper 16 to pass the test. A small tolerance can allow the real and perfect printed papers to pass through the test, but may fail used real printed papers. However, a big tolerance may allow both the used printed papers and falsified printed papers to pass through the test and such condition is not acceptable.

SUMMARY OF THE INVENTION

It is therefore a primary objective of the present invention to provide a printed paper identification system which can solve the above mentioned problem.

Briefly, in a preferred embodiment, the present invention provides a printed paper identification system comprising:

a paper passage slot;

a propeller for driving a printed paper through the passage slot;

an identification mechanism having a plurality of light sources and a detecting device installed at two opposite sides of the passage slot; and a controller connected to the propeller and the identification mechanism for actuating the propeller to carry the printed paper through the passage slot, having the detecting device to detect the lights emitted from the light sources and through a predetermined area of the printed paper and generate a correspondent detected signal for each of the light sources, forming one characteristic signal by using difference between the detected signals, and comparing the characteristic signal with at least one prestored identification signal to determine whether the printed paper is a falsified document.

It is an advantage of the present invention that the characteristic signal is generated by the difference between the detected signals so that variations over each detected signal caused by the fading problem will not greatly affect the characteristic signal.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
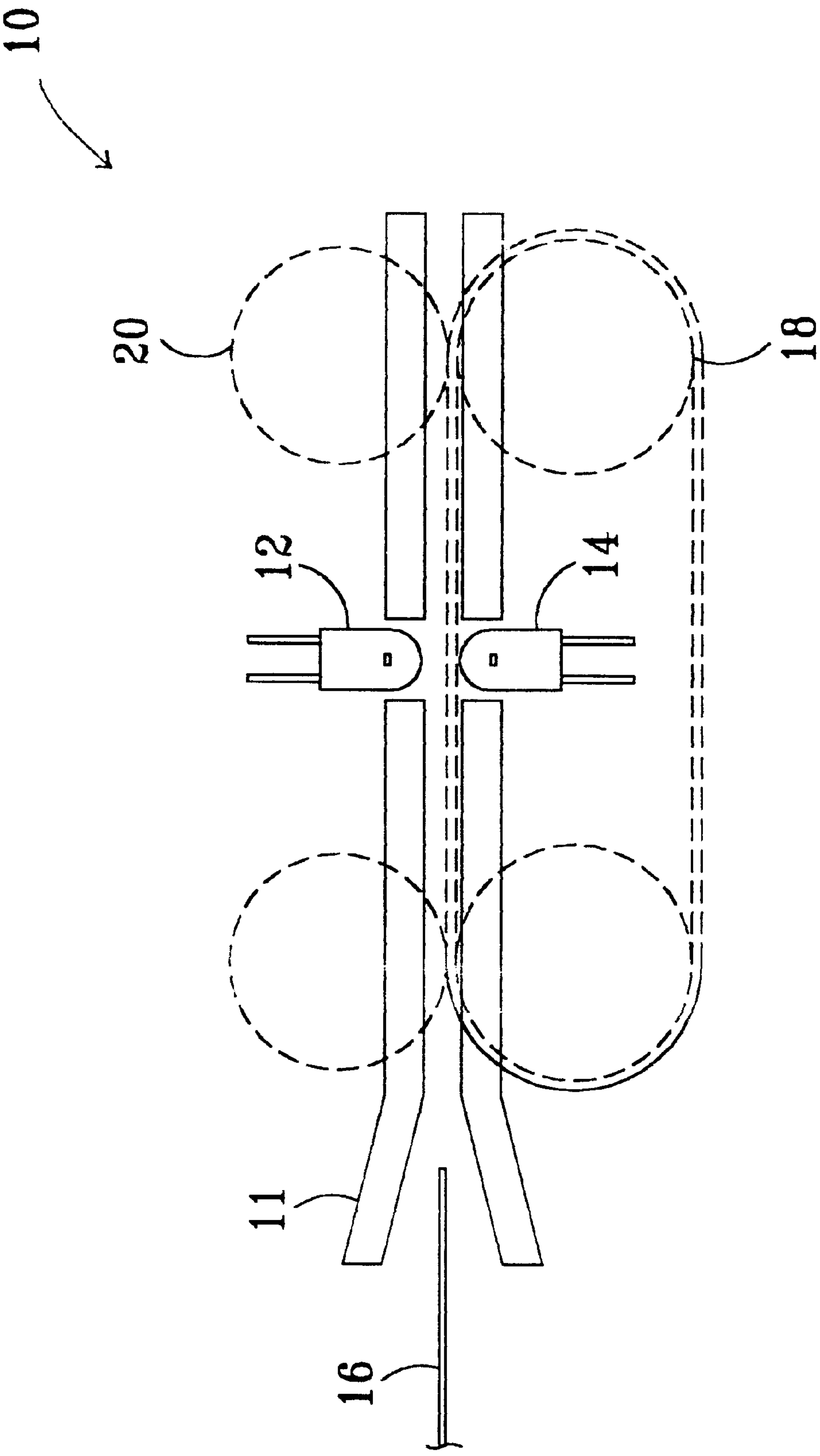
FIG. 1 is a schematic diagram of a prior art printed paper identification system.
Figure 2:
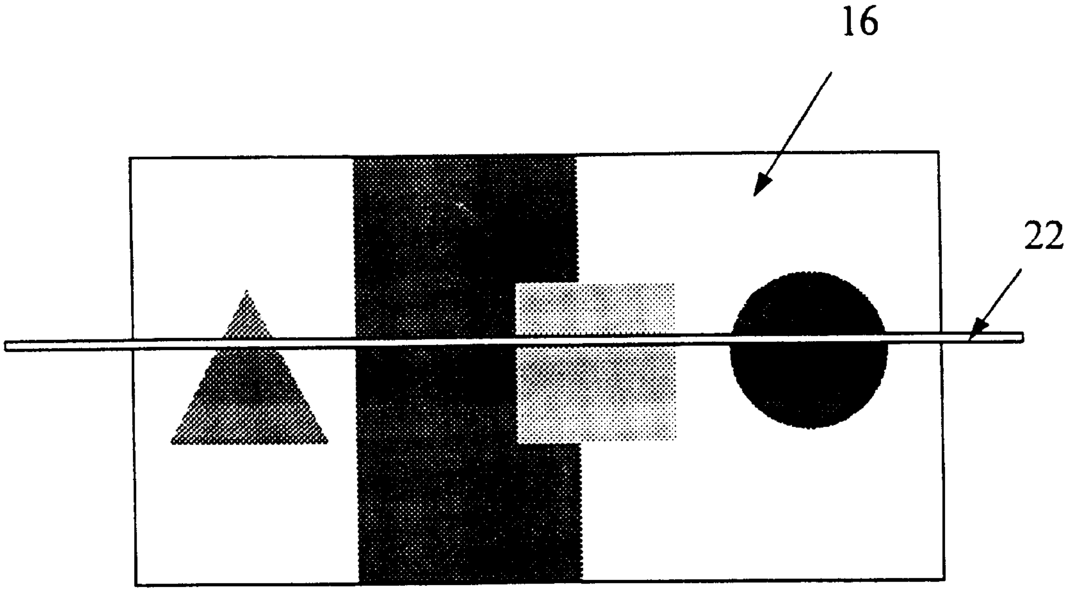
FIG. 2 is a top view of the printed paper shown in FIG. 1.
Figure 3:
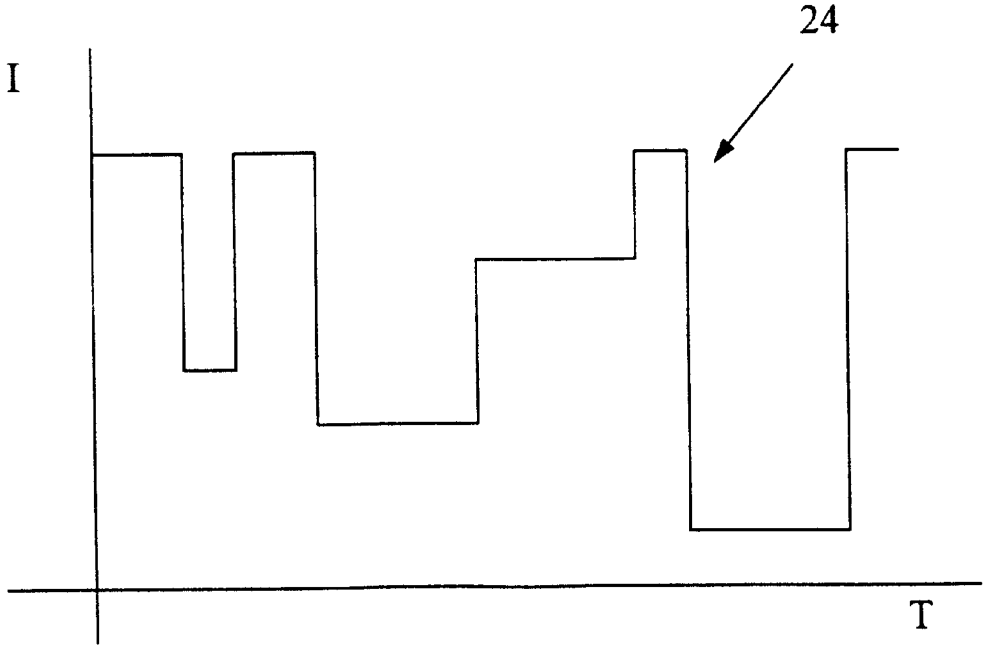
FIG. 3 is the detected signal generated by the printed paper shown in FIG. 2.
Figure 4:
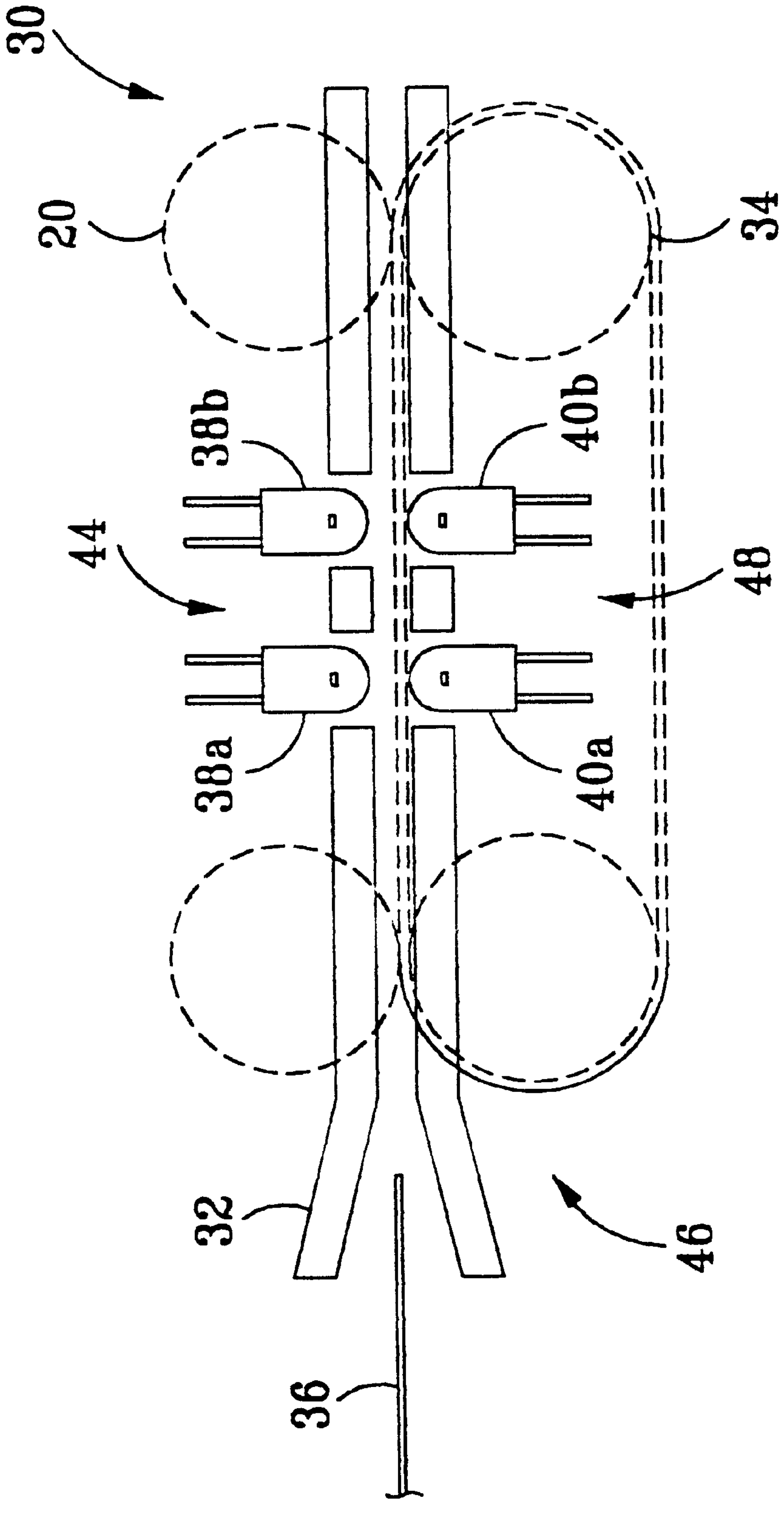
FIG. 4 is a schematic diagram of a printed paper identification system according to the present invention.
Figure 5:
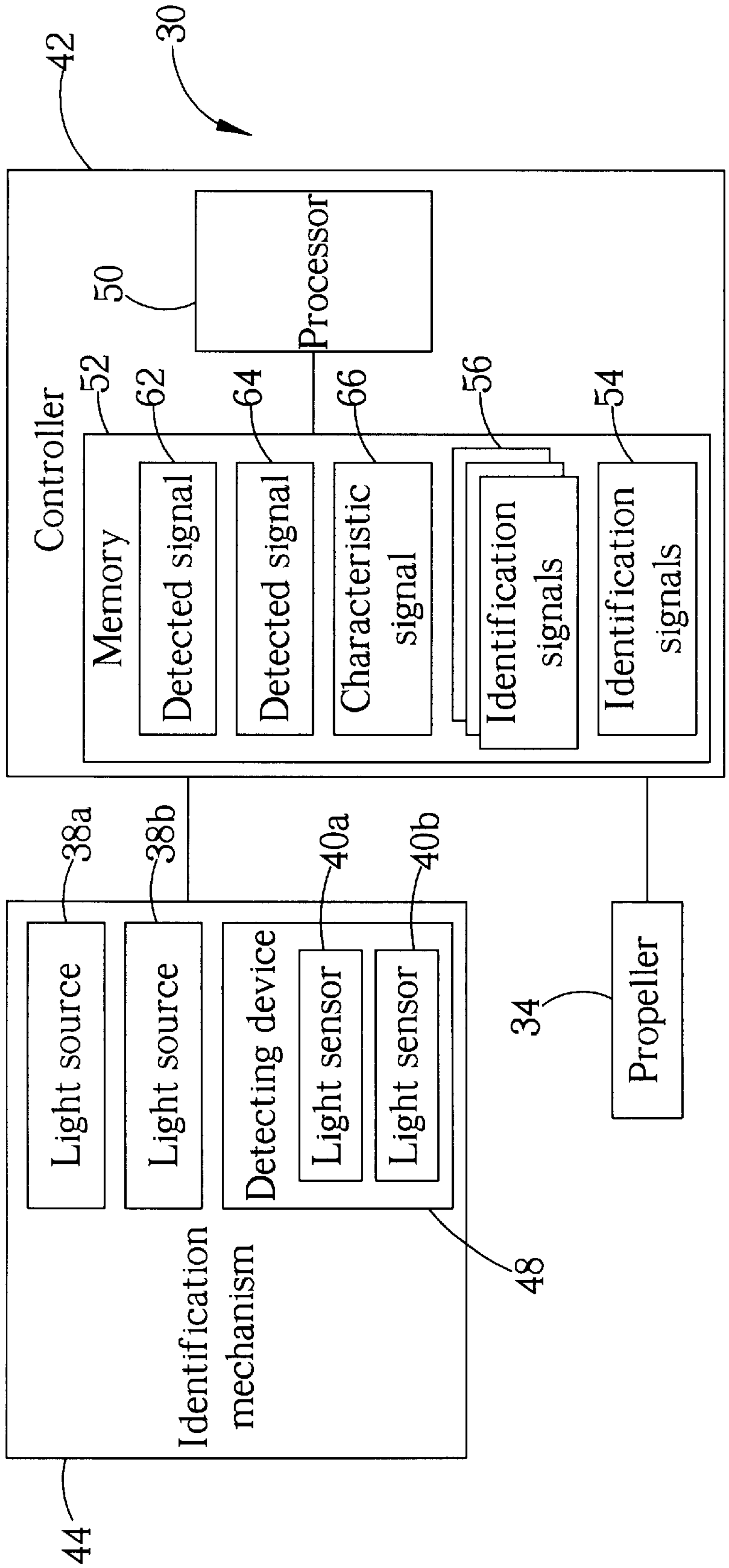
FIG. 5 is a function block diagram of the printed paper identification system shown in FIG. 4.
Figure 6:
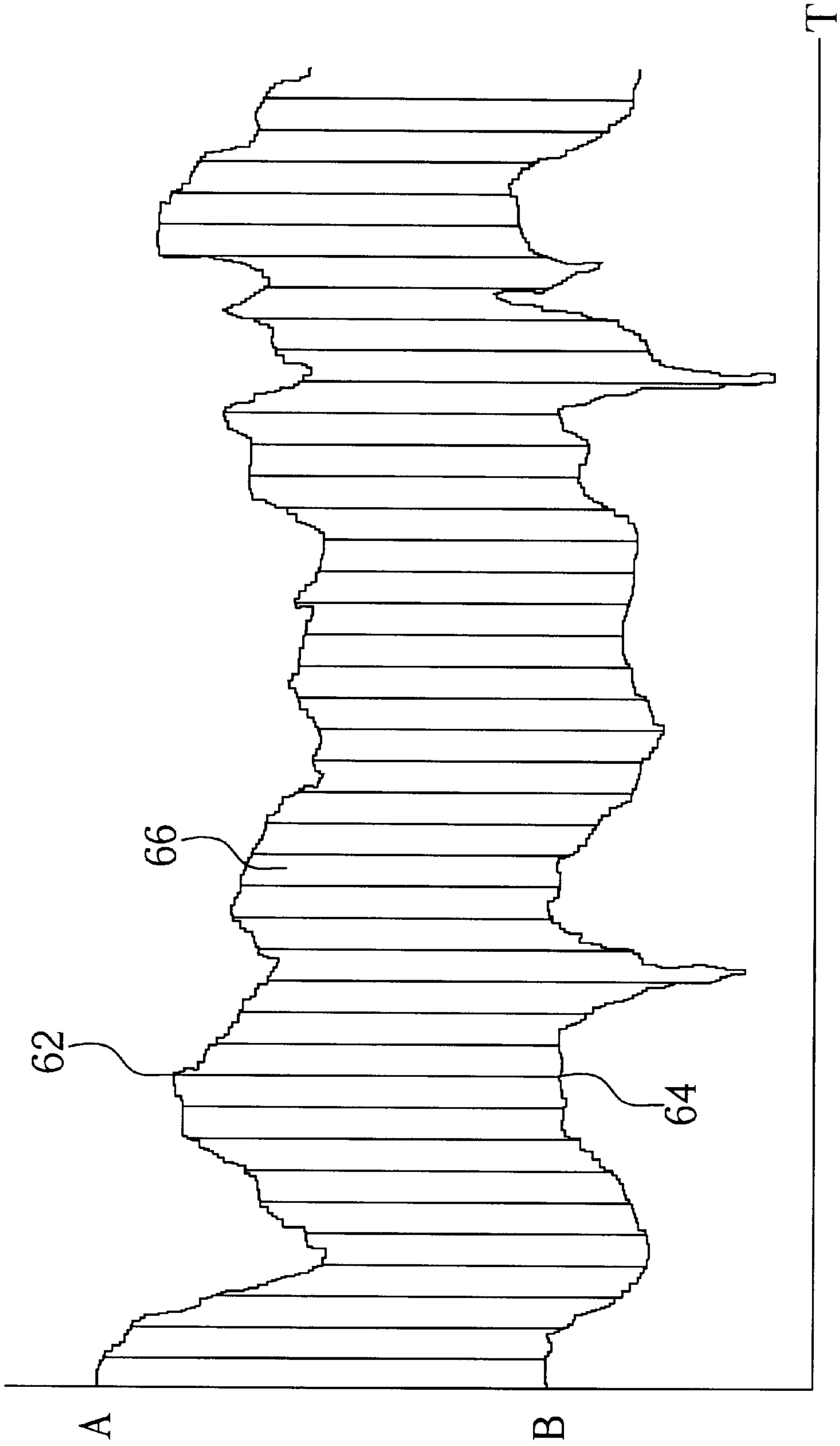
FIG. 6 shows the detected signals generated by the two light sensors shown in FIG. 4.

Please refer to FIGS. 4 to 6. FIG. 4 is a schematic diagram of a printed paper identification system 30 according to the present invention. FIG. 5 is a function block diagram of the system 30 shown in FIG. 4. FIG. 6 shows two detected signals 62 and 64 generated by the two light sensors 40*a* and 40*b* shown in FIG. 4. The system 30 comprises a paper carrying mechanism 46 for driving a printed paper 36, an identification mechanism 44 for identifying the printed paper 36, and a controller 42. The paper carrying mechanism 46 comprises a paper passage slot 32 and a propeller 34 for driving the printed paper 36 through the passage slot 32. The printed paper 36 can be a bank note which is in a rectangular shape with a strip area like the strip area 22 of the printed paper 16 shown in FIG. 2. The identification mechanism 44 is installed at two opposite sides of the passage slot 32. It comprises two light sources 38*a* and 38*b* horizontally installed at one side of the passage slot 32, and a detecting device 48 installed at the other side of the passage slot 32. The two light sources 38*a* and 38*b* are in different wavelengths. The detecting device 48 comprises two horizontally installed light sensors 40*a* and 40*b* for detecting the lights emitted from the two corresponding light sources 38*a* and 38*b* separately and generating two detected signals. When the printedpaper 36 is horizontally carried through the passage slot 32, its strip area will horizontally pass through the two light sensors 40*a* and 40*b* which will generate the two detected signals 62 and 64.

The light sources 38*a* and 38*b* are made of light emitting diodes (LEDs) of different wavelengths, and the light sensors 40*a* and 40*b* are both all-band sensors for detecting the light emitted from the light sources 38*a* and 38*b*. The light sources 38*a* and 38*b* are separately installed along the passage slot 32 so that each of the light sensors 40*a* and 40*b* can only detect the light emitted from its correspondent light source. Since the lights emitted from the two light sources 38*a* and 38*b* have different wavelengths, if each of the sensors 40*a* and 40*b* can detect only the specific wavelength of its correspondent light source, then the two pairs of light sources 38*a* and 38*b* and light sensors 40*a* and 40*b* can be installed together and no interference will occur between them.

The controller 42 is electrically connected with the propeller 34 of the paper carrying mechanism 46 and the identification mechanism 44 for controlling the paper carrying mechanism 46 to carry the printed paper 36 through the passage slot 32 so that the two light sensors 40*a* and 40*b* can detect the lights emitted from the light sources 38*a* and 38*b* and transmitted through the strip area of the printed paper 36 separately, generate the correspondent detected signals 62 and 64, generate a characteristic signal 66 by using the difference between the two detected signals 62 and 64, and compare the characteristic signal 66 with a plurality of pre-stored identification signals 56 to determine whether the printed paper 36 is a falsified document. The controller 42 comprises a memory 52 for storing an identification program 54, the detected signals 62 and 64, and the pre-stored identification signals 56, and a processor 50 for executing the identification program 54.

The identification program 54 uses the difference between the detected signals 62 and 64 to form a characteristic signal 66, and compares the characteristic signal 66 with the identification signals 56 to determine whether the printed paper 36 is a falsified document. Since the printed paper 36 may be fed into the passage slot 32 of the system 30 in various manners such as front end first or rear end first, or in an upside down manner, etc., an identification signal 56 is usually generated for each feeding manner by using a real printed paper so that it is not necessary to feed the printed paper 36 into the system 30 in a fixed manner. When the characteristic signal 66 of the printed paper 36 is generated, the identification program 54 will compare it with all identification signals 56 to determine whether the printed paper 36 is a falsified one. Moreover, the identifiability of the printed paper identification system 30 can be improved by adding more light sources and light sensors for scanning other strip areas of the printed paper 36.

When the printed paper 36 passes through the passage slot 32, the detected signals 62 and 64 are generated sequentially by the light sensors 40*a* and 40*b*. There is a time difference between the generation times of the two detected signals 62 and 64. When converting the detected signals 62 and 64 into the characteristic signal 66, the identification program 54 will align the two detected signals 62 and 64 first to eliminate the time difference so that the characteristic signal 66 can be correctly generated.

Because the detected signals 62 and 64 are separately generated when the strip area of the printed paper 36 passes through the two light sources 38*a* and 38*b* of different wavelengths, the characteristic signal 66 represents the difference between these two detected signals 62 and 64. Since the strip area of the printed paper 36 has different capabilities in absorbing the lights of different wavelengths emitted from the two light sources 38*a* and 38*b*, the characteristic signal 66 represents the difference of the strip in absorbing the lights emitted from the two light sources 38*a* and 38*b*. As mentioned above, the color on the surface of the printed paper 36 may fade away after long use, and the fading will cause similar variations over the waveforms of both detected signals 62 and 64 generated by the printed paper 36. Since the characteristic signal 66 is formed by the difference between the two detected signals 62 and 64, the similar variations over the two detected signals 62 and 64 will compensate each other when generating the characteristic signal 66, and thus the variations over the waveform of the characteristic signal 66 caused by the fading problem will be much less than the variations over each of the detected signals 62 and 64. This design greatly enhances the capability of the printed paper identification system 30 in identifying used printed papers.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A printed paper identification system comprising:

a paper passage slot;

a propeller for driving a printed paper through the passage slot;

an identification mechanism having a plurality of light sources, wavelength of each of the light sources being different from each other, and a detecting device installed at two opposite sides of the passage slot; and a controller connected to the propeller and the identification mechanism for actuating the propeller to carry the printed paper through the passage slot, having the detecting device to detect the lights emitted from the light sources and through a predetermined area of the printed paper and generate a correspondent detected signal for each of the light sources, forming one characteristic signal by using difference between the detected signals of different wavelength, and comparing the characteristic signal with at least one pre-stored identification signal to determine whether the printed paper is a falsified document.

2. The printed paper identification system of claim 1 wherein the printed paper is in a rectangular shape and when the printed paper is horizontally driven through the passage slot, the predetermined area will horizontally pass through the light sources so that the detecting device can generate the detected signal for each of the light sources.

3. The printed paper identification system of claim 2 wherein the printed paper comprises a front edge, a rear edge, an upper edge and a lower edge, and the front end of the printed paper inserted into the passage slot can be its front edge or rear edge, and the lower end of the printed paper inserted in the passage slot can be its upper edge or lower edge, and wherein each way of inserting the printed paper into the passage slot has a correspondent identification signal pre-stored in the controller, and when the characteristic signal of the printed paper is generated, it will be compared with all the identification signals to determine whether the printed paper is a falsified document.

4. The printed paper identification system of claim 1 wherein the printed paper is a bank note.

5. The printed paper identification system of claim 1 wherein each of the light sources is a light emitting diode (LED) with a specific color.

6. The printed paper identification system of claim 1 wherein the detecting device comprises a plurality of light sensors and each of the light sensors is used for detecting the light emitted from one corresponding light source so as to generate the detected signals.

7. The printed paper identification system of claim 6 wherein each of the light sensors is an all-band sensor for detecting the light emitted from one corresponding light source.

8. The printed paper identification system of claim 7 wherein each of the light sources is separately installed along the passage slot so that the light emitted from each light source can only be detected by its correspondent light sensor.

9. The printed paper identification system of claim 6 wherein each of the light sensors can only detect the light of a specific wavelength emitted from its correspondent light source.

10. The printed paper identification system of claim 1 wherein the controller comprises a memory for storing an identification program, the detected signals and the identification signal, and a processor for executing the identification program wherein the identification program is used for processing the detected signals so as to generate the characteristic signal, and comparing the characteristic signal with the identification signal to determine whether the printed paper is a falsified document.

* * * * *